March 21, 1933. J. P. HALLORAN 1,902,124
AIR DRIVEN AUTOMOBILE
Filed Jan. 12, 1932
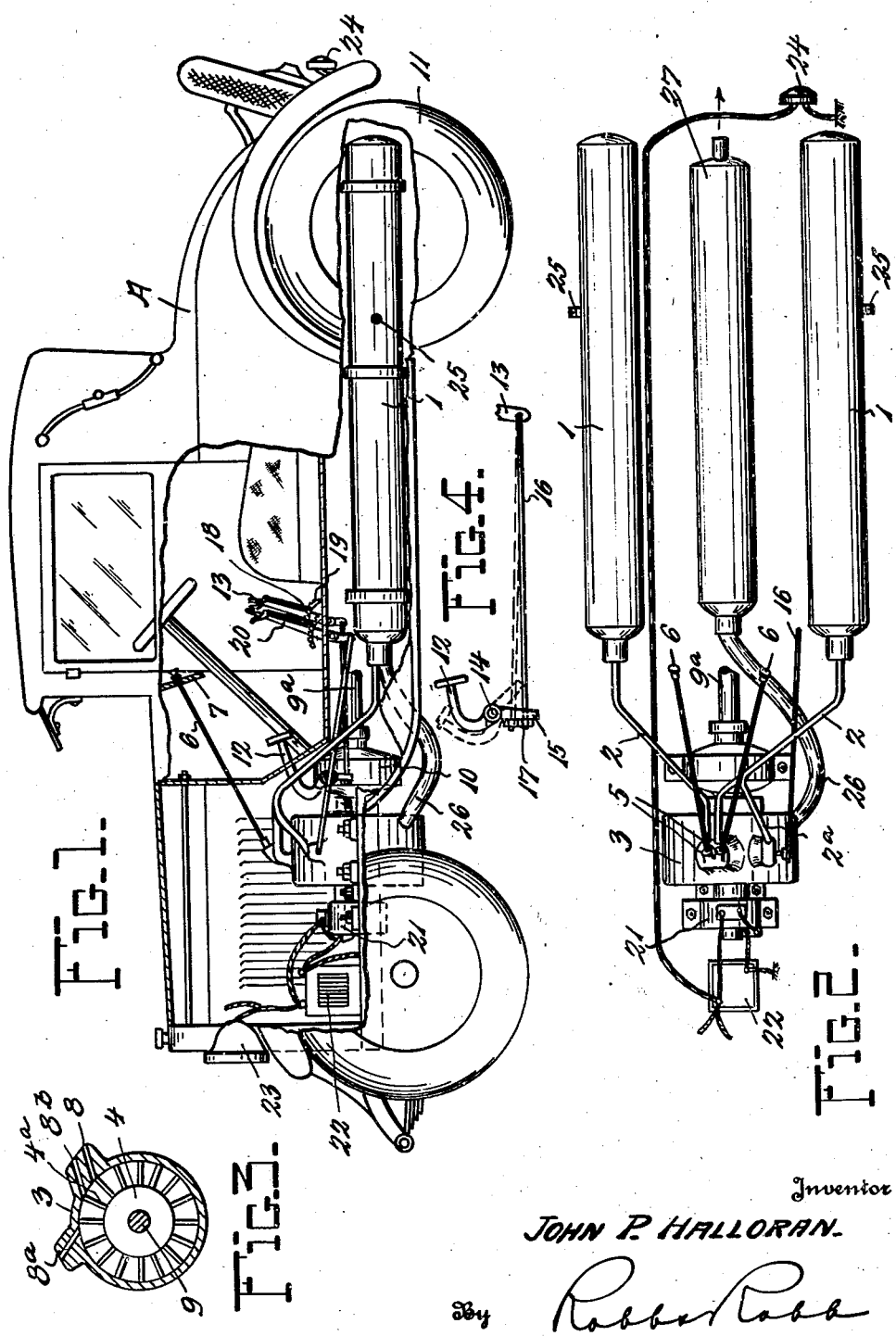
Inventor
JOHN P. HALLORAN.
By Robert Robb
Attorneys Patented Mar. 21, 1933

1,902,124

UNITED STATES PATENT OFFICE

JOHN P. HALLORAN, OF MAYFIELD HEIGHTS, OHIO

AIR DRIVEN AUTOMOBILE

Application filed January 12, 1932. Serial No. 586,245.

By the present invention it is proposed to replace the usual internal combustion engine and power transmission system of motor driven vehicles by a novel source of power, utilizing as the propelling means a compressed fluid stored for use in suitable receptacles provided for this purpose, the present improved system utilizing the force of a jet of such compressed fluid impinging upon a turbine wheel which is arranged to drive the power shaft for propelling the vehicle.

The novel mechanism of this invention permits the omission of many of the power transmitting instrumentalities used in the internal combustion engine type of motor propelled vehicle. It eliminates entirely the engine and associated parts, and greatly simplifies the power transmission system as will be clearly apparent from a consideration of the following detailed description when taken with the accompanying drawing, in which Figure 1 is a side elevation, partly in section, illustrating the details of the improved construction as applied to a standard type passenger motor driven vehicle.

Figure 2 is a fragmentary plan view of the principal parts of the elements of Figure 1.

Figure 3 is a sectional view through the driving wheel housing, showing the turbine wheel mounted on the power shaft, and also showing intakes for the pressure fluid for driving the turbine wheel, and Figure 4 is a detailed fragmentary view, somewhat diagrammatic in character, of a form of clutch actuating instrumentalities utilizable in connection with this improved construction.

Referring more particularly to the drawing, the usual type motor driven vehicle A has mounted, beneath its body, pressure tanks 1 which are connected through suitable conduits 2 with the interior of the housing 3 which contains a turbine wheel or rotor 4. The intakes for the conduits 2 are controlled by valves 5, which are in turn operated by the handle members 6 positioned on the instrument board 7 of the vehicle, so that upon suitable manipulation of these handles 6 the flow of fluid from the tanks 1 against the blades 4a of the turbine wheel 4, can be suitably controlled. The intakes for this fluid, indicated at 8, are so disposed that the jet of fluid issuing through these intake orifices will be directed obliquely against the blades 4a of the turbine wheel 4. For the compressed fluid, air is a suitable example because of its ready availability and its adaptability by high compression.

The turbine wheel 4 is mounted upon the shaft 9 so that rotation of the rotor will cause corresponding rotation of the shaft, power transmission from which is controlled through the clutch of standard construction, illustrated generally at 10, so that when this clutch is in engagement, power will be transmitted to the drive wheels 11 in the usual manner, there being the usual main driving shaft 9a interconnecting the clutch with the usual differential, not shown.

This clutch 10 is normally in engagement, but when desired, it may be disengaged either through the manipulation of a pedal 12 or through actuation of a hand lever 13, which latter lever controls the clutch so that it may be locked in disengagement when desired so that the wheel 4 may be maintained running without there being power transmitted to the driving wheels.

The details of this clutch operating mechanism are shown in Figure 4, and it will be seen that the pedal 12 operates on the pivot 14, and is provided with the extension 15 which is slotted to receive the rod 16. The rod 16 is freely movable in the extension 15 in one direction, while abutting against the extension 15 through provision of a nut 17 by which the extension 15 and pedal 12 may be moved into position shown in the dotted lines when the rod 16 is pulled in the direction of the arrow upon actuation of the lever 13, the bottom end of which is shown fragmentarily in Figure 4. Since this pedal 12, together with its extension 15, produces upon further actuation of the pedal, disengagement of the clutch elements when this pedal is actuated by pressure of an operator's foot, it will freely move relatively to the rod 16 to disengage the clutch elements, but if it should be desired to lock the clutch elements in disengaged position, this may be accomplished through actuation of the hand lever 13 as previously described, which lever is provided with a pawl 18 adapted to interlock with the teeth of the ratchet 19 in a manner which will be readily understood.

One important feature of the invention lies in the manner of introducing the compressed gaseous propellant against the rotor blades 4a. The details of this feature are shown in Figure 3 and by reference to this figure, it will be seen that the rotor housing 3 is provided with suitable projections through which lead the admission ports or nozzles 8, 8b, and 8a. The number of these ports may be varied as desired, but at least one of them, such as 8a, is positioned so as to introduce its jet in a direction opposing that of the remaining jets, so that the direction of rotation of the rotor 4 may be reversed as desired. The speed of rotation of the rotor may also be controlled through the number of the ports available; in the present instance, the two ports 8 and 8b cooperating to give two forward speeds of the vehicle, for it is obvious that assuming the ports 8 and 8b to be of equal area and both are open, the rotor 4 will rotate at double the speed with the same air or gas pressure on each port than will be the case when only one of these ports is employed. There is obviously necessary a separately operable control valve for admitting the compressed propellant to the respective ports, so that the flow thereof through the ports can be controlled at will. Each of these valves may be satisfactorily of the usual needle type to produce a high velocity jet against the rotor blades while preventing loss of propellant through leakage and inefficient application thereof to the blades 4a.

As above pointed out, reversal of direction of the rotor is accomplished by employing a counter-directed blast, as through the port 8a, to rotate the rotor in the opposite direction, supply of compressed air therefor being obtained by suitably branching one of the conduits 2, as at 2a, and leading this branch to the counter-acting orifice.

A pressure of 350 lbs. in the tanks 1 is usually sufficient for suitable propulsion of the vehicle, although this value is determined by the type of vehicle and conditions of operation. It will be understood, of course, that any number of such blasts or jets may be provided, and that the admission of air to the blades 4a is very closely controllable by the driver of the vehicle. The reverse flow of compressed gas for reversing the direction of travel of the vehicle is conveniently controlled through the provision of a lever 20, similar to the usual hand brake.

There may be also included the usual current generator 21 for charging a battery 22, by means of which the head and tail lights 23 and 24 are suitably operated. To facilitate introduction of the compressed air in the tanks 1, the tanks are provided with inlet valves 25.

It will thus be seen that the entire usual engine system with its ignition and water circulating systems is dispensed with and that the construction is very highly simplified.

The exhaust from the turbine housing 3 is indicated at 26, the exhaust passing through the tank 27 which acts to silence the noise of the exhaust.

To further decrease operating noises, the pipes 2, 2a, and turbine housing 3 are desirably covered with solid rubber.

Having thus described my invention, what I claim as new and desire to secure by Letters Patent of the United States, is—

A driving mechanism for vehicles comprising the combination with the chassis of a vehicle, of pressure receptacles disposed in side by side relation beneath the chassis and carried thereby and adapted to contain a compressed gaseous propelling medium, a motor interconnected with the said receptacles and provided with a rotor operable under pressure of jets of the said propelling medium directed obliquely thereagainst, conduits connecting the receptacle and motor and terminating in jet forming orifices, at least one of which is inclined at an angle opposing that of the remaining orifices to permit reverse rotation of the rotor, one of the said conduits being branched to provide an arm for communicating a portion of the propelling medium when desired into the said opposing orifice, control means for each orifice, means for operating the said control means independently of each other and located on the usual instrument board of the vehicle, power transmitting instrumentalities leading from the rotor to the driving wheels of the vehicle for transmitting movement of the rotor to the said driving wheels for propelling the vehicle under influence of jets of the said gaseous propelling medium against the rotor, and a silencing tank for the exhaust from the motor.

In testimony whereof I affix my signature.

JOHN P. HALLORAN.